United States Patent
Nakazawa et al.

(10) Patent No.: US 6,805,157 B2
(45) Date of Patent: Oct. 19, 2004

(54) STRUCTURE FOR FIXING CHECK VALVE

(75) Inventors: Chiharu Nakazawa, Kanagawa (JP); Hikaru Morita, Kanagawa (JP)

(73) Assignee: Hitachi Unisia Automotive, Ltd., Atsugi (JP)

( * ) Notice: Subject to any disclaimer, the term of this patent is extended or adjusted under 35 U.S.C. 154(b) by 0 days.

(21) Appl. No.: 10/356,637

(22) Filed: Feb. 3, 2003

(65) Prior Publication Data

US 2003/0196704 A1 Oct. 23, 2003

(30) Foreign Application Priority Data

Apr. 22, 2002 (JP) ........................................ 2002-119094

(51) Int. Cl.[7] .............................................. F16K 15/04
(52) U.S. Cl. ..................... 137/540; 137/454.4; 137/539; 251/337
(58) Field of Search ................................. 137/539, 540, 137/543.19, 454.2, 454.4, 454.6; 251/337

(56) References Cited

U.S. PATENT DOCUMENTS

| | | | | |
|---|---|---|---|---|
| 3,913,615 A | * | 10/1975 | Cooper | ................. 137/543.19 |
| 4,700,741 A | * | 10/1987 | Murphy | ................. 137/543.19 |
| 5,725,013 A | * | 3/1998 | Premiski et al. | .......... 137/454.2 |
| 6,244,295 B1 | * | 6/2001 | Bartussek et al. | .......... 137/540 |
| 6,398,317 B1 | * | 6/2002 | Burgdorf et al. | .......... 303/116.2 |
| 6,622,751 B1 | * | 9/2003 | Beck et al. | ............ 137/315.33 |

FOREIGN PATENT DOCUMENTS

| | | |
|---|---|---|
| JP | 10-250544 A | 9/1998 |
| WO | WO 98/52801 | * 11/1998 |

* cited by examiner

*Primary Examiner*—Ramesh Krishnamurthy
(74) *Attorney, Agent, or Firm*—Foley & Lardner LLP

(57) ABSTRACT

A check-valve fixing structure includes a base body formed with a passage in which a check valve is inserted, a receiver formed in the passage, and a flange formed with a socket member of the check valve and engaged with the receiver when the check valve is inserted in the passage. With the flange being placed on a valve-seat member of the check valve and abutting on the receiver, the base body is crimped at an opening end of the passage to fix the socket member and the valve-seat member to the base body.

7 Claims, 4 Drawing Sheets

STRUCTURE FOR FIXING CHECK VALVE

BACKGROUND OF THE INVENTION

The present invention relates to the structure for fixing a check valve.

JP-A 10-250544 discloses a brake control system which can generate a braking force even when a driver provides no brake-pedal operation. With this system, a pump is driven to produce the hydraulic pressure in response to the running conditions of the vehicle, which is supplied to a wheel cylinder, thereby actively generating a braking force even when a driver provides no brake-pedal operation. Such control for actively generating a braking force is referred hereafter to as active brake control.

The brake control system comprises a check valve for permitting brake fluid to flow in one direction only. In the above reference, a check valve is arranged in a passage connecting a reservoir, a pump, and a master cylinder to permit brake fluid to flow from the reservoir to the pump and the master cylinder, and prevent it from flowing from the master cylinder and the pump to the reservoir.

Typically, the check valve comprises a valve-seat member arranged in a passage of a housing or base body and including a valve seat, a return spring for biasing a valve element seated on the valve seat in the closed direction to provide a predetermined checking force, and a socket member mounted to the valve-seat member and for supporting the return spring and restricting a radial displacement of the valve element. The structure for fixing the check valve to the housing is obtained by fixing the socket member to the valve-seat member by fitting, inserting the valve-seat member in the passage of the housing, and crimping an open end of the passage for fixing.

However, as is designed such that the socket member is fixed to the valve-seat member by fitting, and the valve-seat member is fixed to the base body by crimping, the above check-valve fixing structure raises the following problem to be solved:

1) Fitting of the socket member to the valve-seat member needs an overlap width for fitting. Moreover, fixing of the valve-seat member to the base body, which is carried out by crimping or the like, needs also an overlap width for crimping. Since the axially extending overlap widths for fitting and crimping should be arranged between the base body and the valve-seat member and the valve-seat member and the socket member, respectively, increasing the overall length or size of the check valve.

2) Assembling of the check valve needs two kinds of work, i.e. work for engaging the socket member with the valve-seat member and work for crimping the valve-seat member to the base body, having rather large number of assembling operations, leading to a time expense and a cost increase.

3) The components of the check valve undergo a brake-fluid pressure. Thus, with the above structure of engaging the socket member with the valve-seat member, if the brake-fluid pressure causes the socket member to be displaced in the disengaging direction with respect to the valve-seat member, the seating position of the return spring is displaced coincidentally, leading to reduced biasing force to the valve element. Then, a checking force of the check valve can vary, failing to provide a desired operation.

SUMMARY OF THE INVENTION

It is, therefore, an object of the present invention to provide the structure for fixing a check valve, which allows not only a reduction in size, number of assembling operations, and manufacturing cost for the check valve, but also a stabilization of a checking function thereof.

The present invention provides generally a structure for fixing a check valve with a valve-seat member having a through hole and a valve seat arranged at an opening end of the through hole and having a valve element seated thereon, a socket member mounted to the valve-seat member to cover the valve element, the socket member restricting an amount of displacement of the valve element within a predetermined value, and a return spring arranged on the socket member to biasing the valve element in a seating direction, wherein the structure comprises: a base body, the base body being formed with a passage in which the check valve is inserted; a receiver formed in the passage; and a flange formed with the socket member, the flange being engaged with the receiver when the check valve is inserted in the passage, wherein with the flange being placed on the valve-seat member and abutting on the receiver, the base body is crimped at an opening end of the passage to fix the socket member and the valve-seat member to the base body.

BRIEF DESCRIPTION OF THE DRAWINGS

The other objects and features of the present invention will become apparent from the following description with reference to the accompanying drawings, wherein.

DETAILED DESCRIPTION OF THE INVENTION

Figure 3:
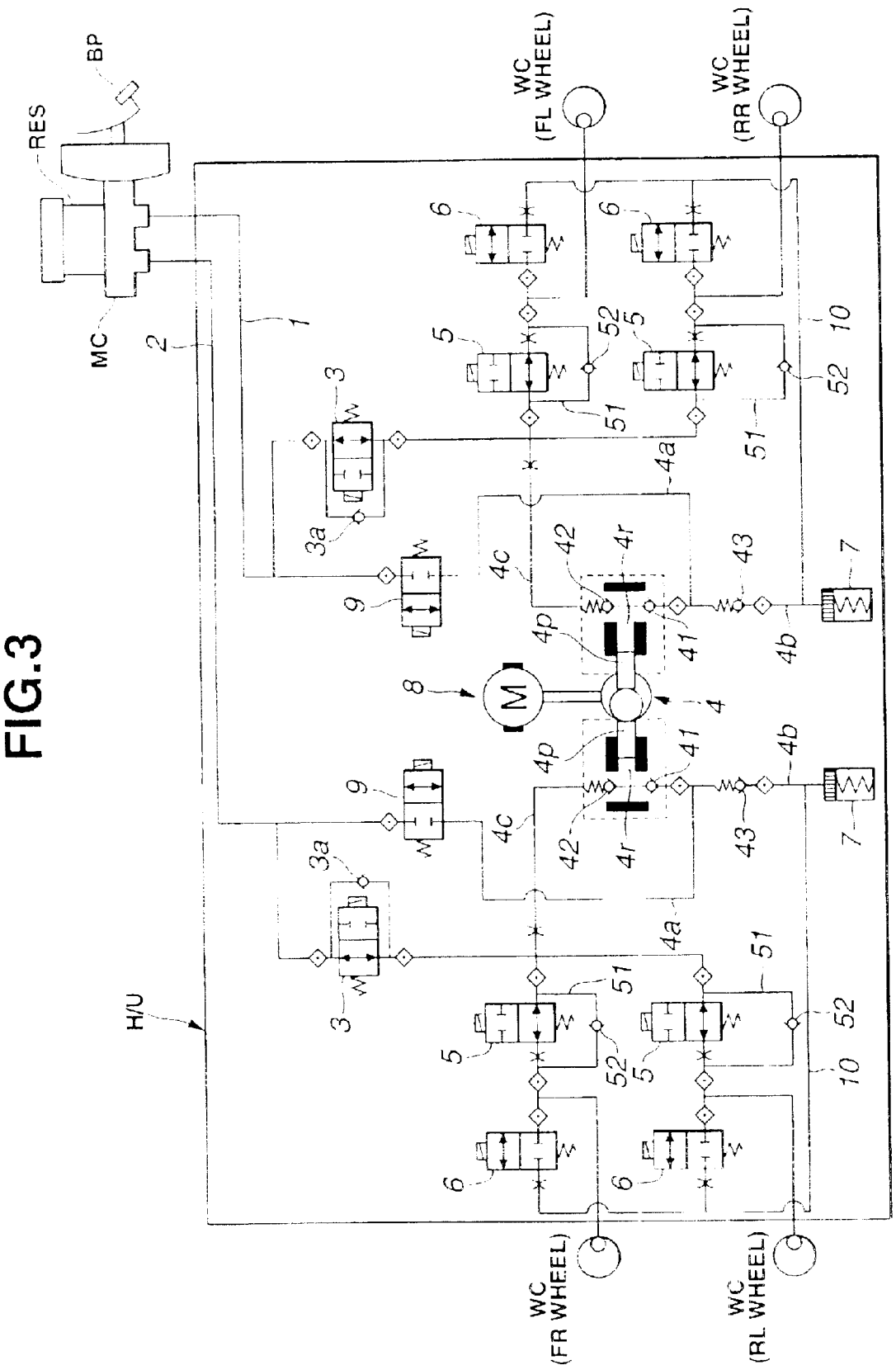
FIG. 3 is a block diagram showing a brake control system including the check valve.

Referring to the drawings, an embodiment of the structure for fixing a check valve is described. Referring first to FIG. 3, the structure of a brake control system is described. The brake control system comprises a master cylinder MC of a well-known type for supplying brake fluid to wheel cylinders WC through brake lines 1, 2 when depressing a brake pedal BP. Master cylinder MC is provided with a reservoir RES for storing brake fluid.

Brake lines 1, 2 are in connecting structure called X line. Specifically, brake line 1 connects front-left wheel WC (FL) and rear-right wheel WC (RR), whereas brake line 2 connects front-right wheel WC (FR) and rear-left wheel WC (RL). Note that in the description hereafter, except when indicating a specific wheel, the wheel cylinder is simply designated by WC with reference numeral in parentheses omitted.

An OUT-side gate valve 3 is arranged in each brake line 1, 2. OUT-side gate valve 3 includes a normally open solenoid valve for switching communication and shutoff of brake line 1, 2 and having an opening degree controlled variably by PWM control during active brake control. A one-way valve 3a is arranged parallel to OUT-side gate valve 3 to allow flow of brake fluid from master cylinder MC (refer hereafter to as upstream side) to wheel cylinder WC (refer hereafter to as downstream side) only.

An inlet valve 5, which includes a solenoid-drive normally open ON/OFF valve, is arranged in brake line 1, 2 downstream of OUT-side gate valve 3. An outlet valve 6, which includes a solenoid-drive normally closed ON/OFF valve, is arranged in a return passage 10 connecting a position downstream of inlet valve 5 and reservoir 7. Therefore, when opening inlet valve 5 and closing outlet valve 6, brake line 1, 2 is in the pressure increasing state where flow of brake fluid is allowed between the upstream side and the downstream side. When closing both valves 5, 6, brake line 1, 2 is in the pressure retaining state where the brake-fluid pressure is confined in wheel cylinder WC. And when closing inlet valve 5 and opening outlet valve 6, brake line 1, 2 is in the pressure reducing state where the brake-fluid pressure within wheel cylinder WC is discharged to reservoir 7. A bypass circuit 51 is arranged parallel to inlet valve 5. A one-way valve 52 is arranged in bypass circuit 51 to allow return of brake fluid from wheel cylinder WC to master cylinder MC only.

A pump 4 is connected to brake lines 1, 2. Pump 4 serves as not only a brake-fluid source during active brake control, but also a returning pump when carrying out ABS control. Pump 4, which includes a plunger pump actuated by a motor 8, is provided with two plungers 4p and a pump chamber 4r in which brake fluid is sucked and discharged by plungers 4p.

Figure 4:
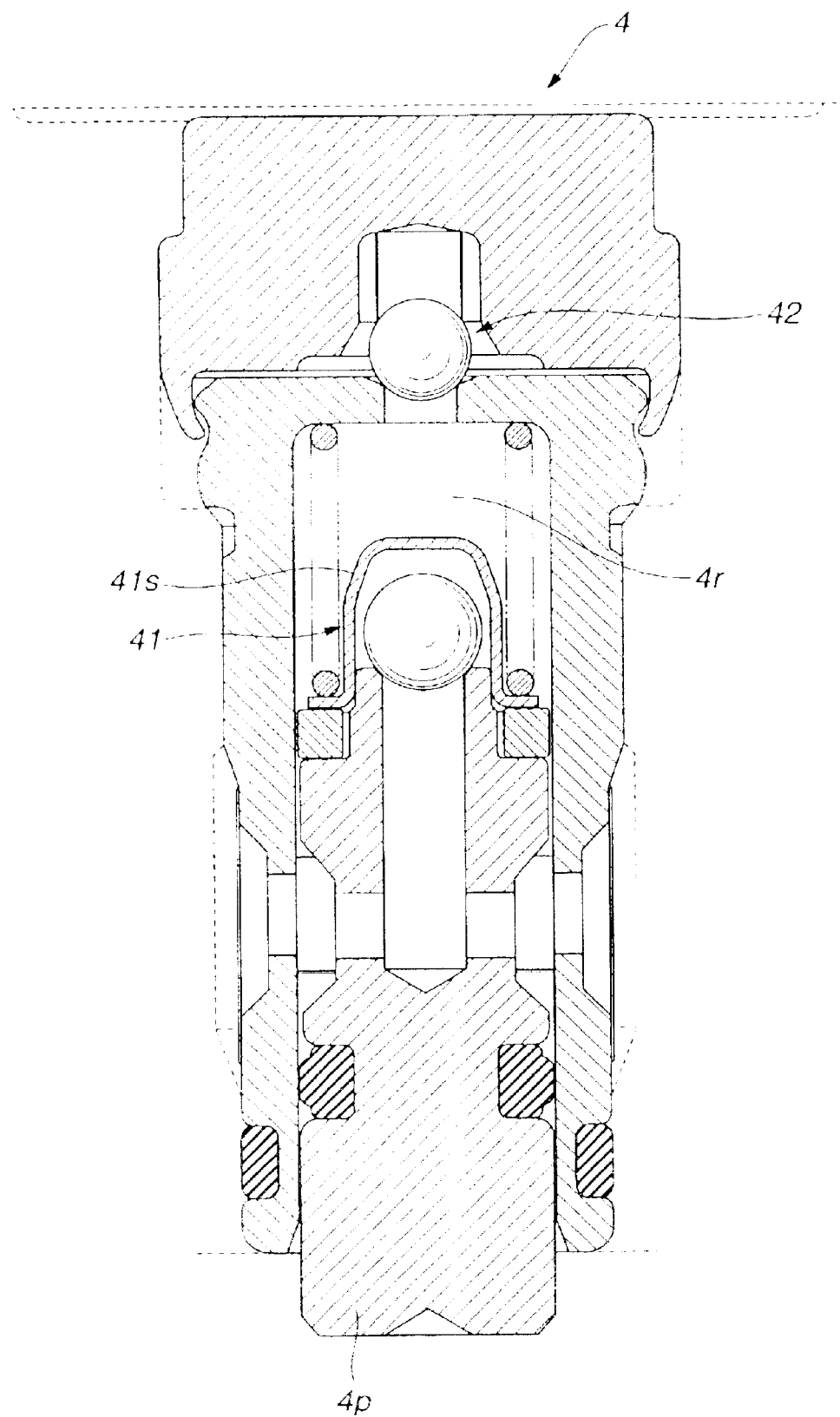
FIG. 4 is a view similar to FIG. 2, showing a pump in the brake control system.

Referring to FIG. 4, the structure of pump 4 is described briefly. Plunger 4p has a lower end abutting on a cam, not shown, to produce vertical slide motion by rotation of the cam. This slide motion varies a volume of pump chamber 4r, causing suction and discharge of brake fluid. A suction valve 41 is arranged at an upper end of plunger 4p to be open at a suction stroke and closed at a discharge stroke. A discharge valve 42 is arranged at an upper end of pump chamber 4r to be closed at a suction stroke and open at a discharge stroke. A socket member 41s is arranged to restrict the amount of displacement of a valve element of suction valve 41.

Returning to FIG. 3, pump chamber 4r is connected to reservoir 7 through suction valve 41 and a suction circuit 4b, and to a position of brake line 1, 2 upstream of OUT-side gate valve 3, i.e. master cylinder MC, through a suction circuit 4a branched from suction circuit 4b. Moreover, pump chamber 4r is connected to a position of brake line 1, 2 between OUT-side gate valve 3 and inlet valve 5 through discharge valve 42 and a discharge circuit 4c. A check valve 43 is arranged in suction circuit 4b in the vicinity of reservoir 7 to allow flow of brake fluid from reservoir 7 to pump 4 and prevent flow thereof in the opposite direction.

An IN-side gate valve 9 is arranged in suction circuit 4a to switch communication and shutoff of suction circuit 4a. IN-side gate valve 9 includes a normally closed solenoid valve.

The structure enclosed with a box forms a brake unit H/U arranged in a single housing H.

The brake control system can perform ABS control and active brake control.

ABS control, a well-known control, is described briefly. Wheel lock during braking is determined in accordance with input information out of a wheel-speed sensor, etc. If it is likely to have a wheel locked, the wheel-cylinder pressure is reduced to avoid wheel lock, then it is reduced, retained or increased so that the speed of the target wheel becomes equal to the most effective speed for braking, which is lower than a vehicle-body speed by a predetermined value. As for the execution of pressure reduction, pressure retention, and pressure increase in ABS control, pressure reduction is carried out by closing inlet valve 5 and opening outlet valve 6, pressure retention is carried out by closing both valves 5, 6, and pressure increase is carried out by opening inlet valve 5 and closing outlet valve 6. In the case of pressure reduction, brake fluid within wheel cylinder WC is discharged and stored in reservoir 7, which is returned to brake line 1, 2 by operation of pump 4.

Active brake control is described. There are known as active brake control automatic brake control, vehicle motion control, traction control, etc.

In this embodiment, when carrying out active brake control, inlet valve 5 and outlet valve 6 are put in non-energization, i.e. inlet valve 5 is opened and outlet valve 6 is closed. At the time of pressure increase, OUT-side gate valve 3 is closed, and IN-side gate valve 9 is opened. Pump 4 is actuated to supply brake fluid to wheel cylinder WC, and motor 8 of pump 4 is PWM-driven to control the pressure-increase amount arbitrarily. In this case, the opening degree of inlet valve 5 may be PWM-controlled to control the pressure-increase amount. At the time of pressure reduction, IN-side gate valve 9 is closed, and motor 8 of pump 4 is put in idle running to produce no discharge. OUT-side gate valve 3 is opened to discharge brake fluid within wheel cylinder WC to master cylinder MC, and the opening degree of OUT-side gate valve 3 is PWM-controlled to control the pressure-reduction amount arbitrarily.

Check valve 43 serves to prevent brake fluid within master cylinder MC from moving to reservoir when a driver carries out braking operation during active brake control.

Figure 2:
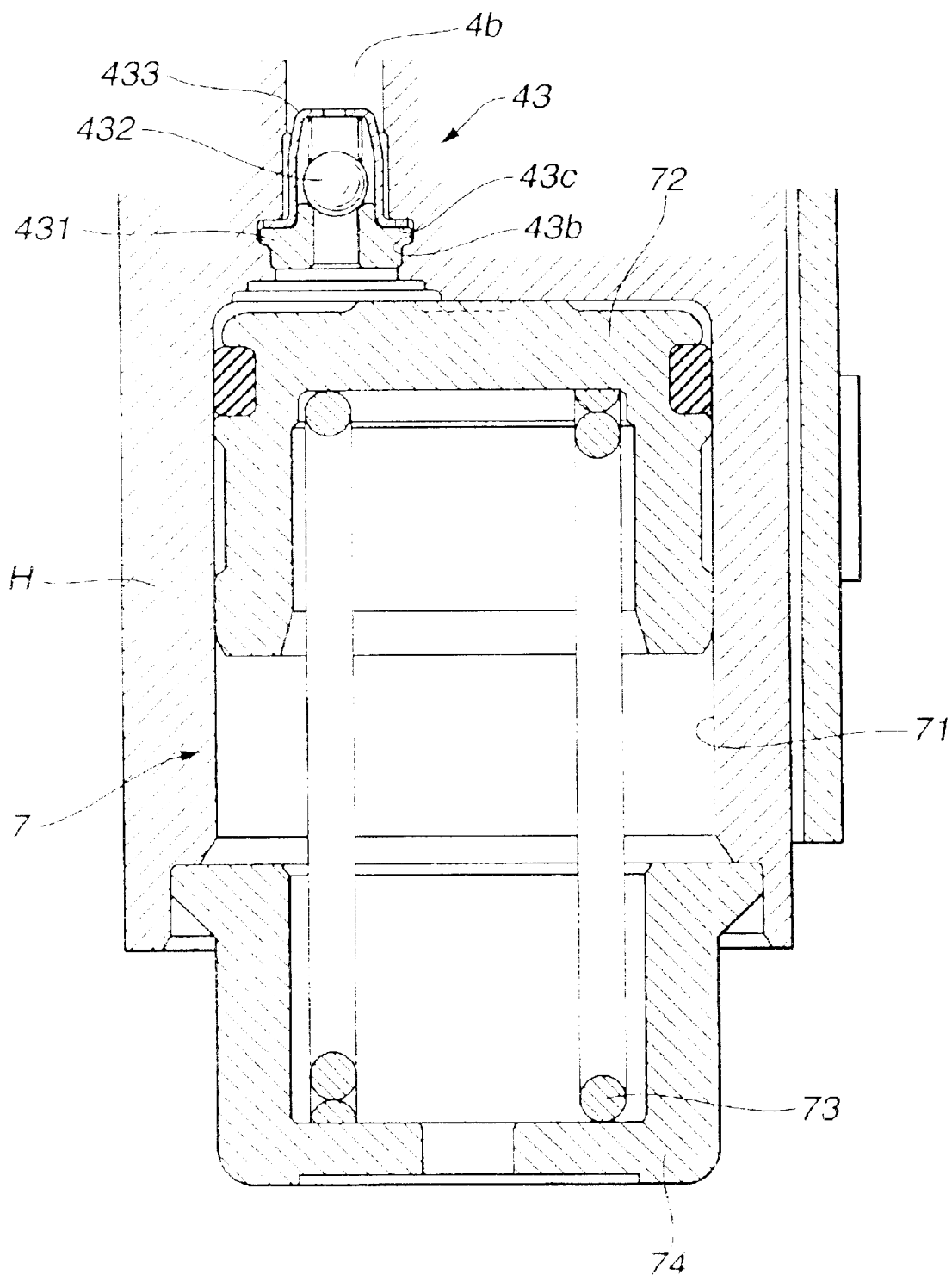
FIG. 2 is a view similar to FIG. 1, showing the check valve and a reservoir.

Referring to FIG. 2, reservoir 7 and check valve 43 are described. Reservoir 7 comprises a piston 72 accommodated axially slidably in a reservoir hole 71 formed in housing H, a spring 73 for biasing piston 72 upwardly as viewed in FIG. 2, and a plug 74 having spring 73 seated thereon.

Check valve 43 is mounted on the bottom of reservoir 71. Specifically, suction circuit 4b is open to the bottom of reservoir 71, and a mounting hole 43b having a larger diameter than that of suction circuit 4b is formed at an opening end of suction circuit 4b. The formation of mounting hole 43b provides a stepped portion or receiver 43c due to difference in hole diameter.

Figure 1:
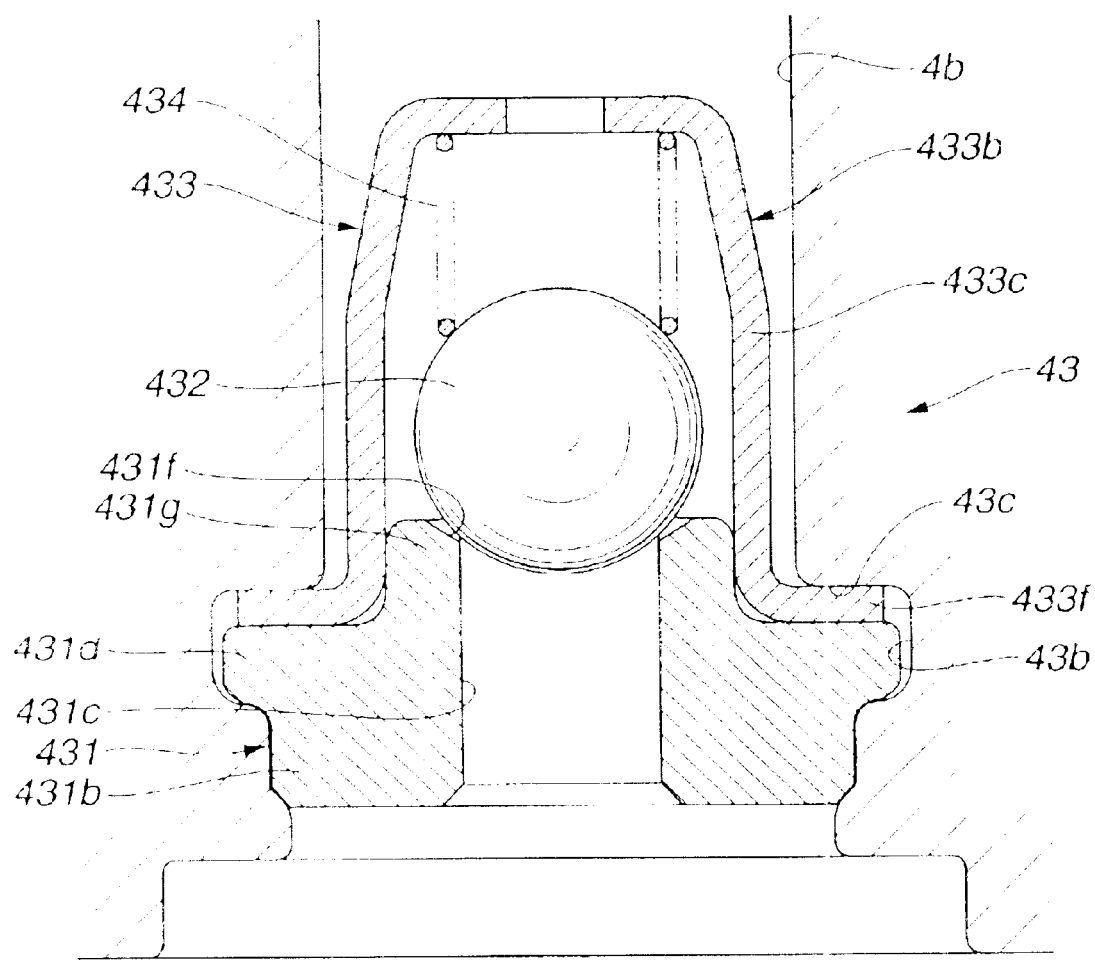
FIG. 1 is a sectional view showing an embodiment of the structure for fixing a check valve according to the present invention.

Check valve 43 is fixed in mounting hole 43b, and comprises a valve-seat member 431, a valve element 432, a socket member 433, and a return spring 434 as shown in FIG. 1.

Valve-seat member 431 comprises a roughly cylindrical main body 431b, a through hole 431c formed axially though main body 431b, a flange 431d protruded from the outer periphery of main body 431b, and a protrusion 431g protruded axially upwardly from main body 431b as viewed in FIG. 1 and having a valve seat 431f at an end of through hole 431.

Valve element 432, which is formed like a ball, can be seated on valve seat 431f. Socket member 433 is obtained by carrying out press working of a metallic material, and comprises a main body 433b and a flange 433f. Main body 433b is formed roughly like a "footman" with a plurality of arms 433c to surround the outer periphery of protrusion 431g of valve-seat member 431, and accommodates therein valve element 432 to restrict the amounts of radial and axial displacements thereof within respective predetermined values. Main body 433b has a space formed between arms 433c to allow flow of brake fluid. Flange 433f is formed like a disc to connect front ends of arms 433c, and is slightly smaller in diameter than flange 431d of valve-seat member 431. Socket member 433 is in common with socket member 41s for suction valve 41 of pump 4.

Return spring 434 is interposed between the bottom of main body 433b of socket member 433 and valve element 432 to bias or press valve element 432 to valve seat 431f.

Check valve 43 is fixed as follows. With valve element 432 and return spring 434 arranged between socket member 433 and valve-seat member 431, and with flange 433f of socket member 433 and flange 431d of valve-seat member 431 placed one upon another, main body 433d of socket member 433 is inserted in suction circuit 4b as shown in FIG. 1 to bring flange 433f of socket member 433 into contact with receiver 43c of mounting hole 43b. In this state, the opening end of mounting hole 43b is crimped to hold flange 433f of socket member 433 and valve-seat member 431 between receiver 43c and the crimped portion.

In this fixed state, since flange 433f is held between receiver 43c and flange 431d of valve-seat member 431 for secure fixing, socket member 433 cannot axially be moved with respect to valve-seat member 431 even when undergoing a suction force of pump 4. Therefore, a basing force of return spring 434 can be maintained constant, resulting in no variation in a checking force of check valve 43.

As described above, since flanges 433f, 431d of socket member 433 and valve-seat member 431 are both crimped to avoid fitting of socket member 433 to valve-seat member 431, work for fitting socket member 433 to valve-seat member 431 can be eliminated, leading to simplified assembling operation. Moreover, there is no need to provide an overlap width to socket member 433 and valve-seat member 431, allowing a reduction in axial dimension and or size of check valve 43. Additionally, as described above, flange 431d is provided to valve-seat member 431, and is placed upon flange 433f of socket member 433 for crimping. Thus, crimping of the opening end of mounting hole 43b of housing H creates a two-stage crimped portion covering the lower end face of flange 431d of valve-seat member 431 as viewed in FIG. 1 and the lower-end outer peripheral face of a general part of valve-seat member 431, obtaining higher fixing force and advantage in fluid leakage. Specifically, considering possible leakage between suction circuit 4b and reservoir 7 by detouring a portion closed by valve element 432 and valve seat 431f, the leakage path detours radially at two spots, i.e. upper and lower sides of flanges 433f, 431d, resulting in difficult occurrence of leakage.

Further, in this embodiment, receiver 43c for receiving flange 433f of socket member 433 can be obtained by merely coaxially forming mounting hole 43b having a larger diameter than that of suction circuit 4b from the opening end of suction circuit 4b, facilitating machining, resulting in excellent manufacturability.

Furthermore, in this embodiment, socket member 433 of check valve 43 is in common with socket member 41s of suction valve 41 of pump 4, resulting in possible reduction in manufacturing cost.

Having described one embodiment of the present invention, the present invention can be realized in other embodiments as described hereafter. Other embodiments can produce the same operation and effect as those in the above embodiment.

In the embodiment, check valve 43 is applied to reservoir 7 of the brake control system, optionally, it can be applied to other elements of the brake control system. Moreover, check valve 43 is applicable to apparatus for transferring the pressure in vehicle-mounted systems other than the brake control system and industrial equipments. Further, in the embodiment, the base body having check valve 43 mounted thereto includes housing H for accommodating brake unit H/U. The base body is not limited to housing H, and may include a casing constituting an outer shell of check valve 43 when check valve is not incorporated in housing H directly.

Still further, in the embodiment, valve-seat member 431 is formed with flange 431d, which is not indispensable, however. Thus, the main body of valve-seat member 431 may be formed like a disc having a through hole, upon which flange 433f of socket member 433 is placed. Further, in the embodiment, valve element 432 is formed like a ball. Alternatively, valve element 432 may be in other shapes such as cone and semi-sphere on condition that the function of the valve element is ensured. Still further, in the embodiment, socket member 433 of check valve 43 is in common with socket member 41s of suction valve 41 of pump 4. Alternatively, a socket member exclusive to check valve 43 may be adopted.

Furthermore, in the embodiment, the depth of mounting hole 43b is set to allow accommodation of valve-seat member 431 in its entirety, and flange 431d of valve-seat member 431 is crimped together with the outer peripheral edge of the general part. Optionally, the depth of mounting hole 43b may be shallower than that in the embodiment, and only flange 431d of valve-seat member 431 may be crimped. In this variation, the axial dimension of check valve 43 required for fixing by crimping can be reduced, resulting in a reduction in overall size of check valve 43. Further, in the embodiment, receiver 43c is obtained by forming mounting hole 43b and providing a stepped portion due to difference in hole diameter. Optionally, the receiver having a small diameter than that of a passage can be obtained by fixing a ring on the inner periphery of the passage by fitting or screwing. Alternatively, the receiver may be obtained by forming a plurality of protrusions by screws or pins protruding inwardly from the outside of the passage.

Having described the present invention with regard to the illustrative embodiments, it is noted that the present invention is not limited thereto, and various changes and modifications can be made without departing from the scope of the present invention.

The entire contents of Japanese Patent Application P2002-119094 filed Apr. 22, 2002 are hereby incorporated by reference.

What is claimed is:

1. A structure for fixing a check valve with a valve-seat member having a through hole and a valve seat arranged at an opening end of the through hole and having a valve element seated thereon, a socket member mounted to the valve-seat member to cover the valve element, the socket member restricting an amount of displacement of the valve element within a predetermined value, and a return spring arranged on the socket member to bias the valve element in a seating direction, the structure comprising:

a base body, the base body being formed with a passage in which the check valve is inserted;

a receiver formed in the passage;

a first flange formed with the socket member, the first flange being engaged with the receiver when the check valve is inserted in the passage; and a second flange formed with the valve-seat member, the second flange having the first flange placed thereon, wherein when the first flange is placed on the second flange and abuts the receiver, the base body is crimped at an opening end of the passage to fix the socket member and the valve-seat member to the base body.

2. The structure as claimed in claim 1, wherein the receiver comprises a stepped portion formed between a mounting hole and the passage due to a diameter difference therebetween, the mounting hole being formed at the opening end of the passage and having a larger diameter than that of the passage.

3. The structure as claimed in claim 1, wherein the receiver comprises a plurality of protrusions protruding inwardly of the passage from the outside thereof.

4. An arrangement, comprising:
a check valve, the check valve comprising:
a valve-seat member having a through hole and a valve seat arranged at an opening end of the through hole and having a valve element seated thereon,
a socket member mounted to the valve-seat member to cover the valve element, the socket member restricting an amount of displacement of the valve element within a predetermined value, and
a return spring arranged on the socket member to bias the valve element in a seating direction;
a base body, the base body being formed with a passage in which the check valve is inserted;
a receiver formed in the passage;
a first flange formed with the socket member, the first flange being engaged with the receiver when the check valve is inserted in the passage; and
a second flange formed with the valve-seat member, the second flange having the first flange placed thereon,
wherein when the first flange is placed on the second flange and abuts the receiver, the base body is crimped at an opening end of the passage to fix the socket member and the valve-seat member to the base body.

5. The arrangement as claimed in claim 4, wherein the receiver comprises a stepped portion formed between a mounting hole and the passage due to a diameter difference therebetween, the mounting hole being formed at the opening end of the passage and having a larger diameter than that of the passage.

6. The arrangement as claimed in claim 4, wherein the receiver comprises a plurality of protrusions protruding inwardly of the passage from the outside thereof.

7. A structure for fixing a check valve with a valve-seat member having a through hole and a valve seat arranged at an opening end of the through hole and having a valve element seated thereon, a socket member mounted to the valve-seat member to cover the valve element, the socket member restricting an amount of displacement of the valve element within a predetermined value, and a return spring arranged on the socket member to bias the valve element in a seating direction, the structure comprising:
a base body, the base body being formed with a passage in which the check valve is inserted;
a receiver formed in the passage;
a first flange formed with the socket member, the first flange configured to be engaged with the receiver when the check valve is inserted in the passage; and
a second flange formed with the valve-seat member, the second flange being configured to have the first flange placed thereon,
wherein the first flange is configured to abut the receiver when placed on the second flange, and wherein the base body is configured to be crimped at an opening end of the passage to fix the socket member and the valve-seat member to the base body.

* * * * *